US010295401B2

United States Patent
Zhang et al.

(10) Patent No.: US 10,295,401 B2
(45) Date of Patent: May 21, 2019

(54) FLEXIBLE CONDUCTIVE DIAPHRAGM, FLEXIBLE VIBRATION SENSOR AND PREPARATION METHOD AND APPLICATION THEREOF

(71) Applicant: SUZHOU INSTITUTE OF NANO-TECH AND NANO-BIONICS (SINANO), CHINESE ACADEMY OF SCIENCES, Suzhou, Jiangsu (CN)

(72) Inventors: Ting Zhang, Jiangsu (CN); Yang Gu, Jiangsu (CN)

(73) Assignee: SUZHOU INSTITUTE OF NANO-TECH AND NANO-BIONICS (SINANO), CHINESE ACADEMY OF SCIENCES, Suzhou (CN)

(*) Notice: Subject to any disclaimer, the term of this patent is extended or adjusted under 35 U.S.C. 154(b) by 0 days.

(21) Appl. No.: 15/559,069

(22) PCT Filed: Aug. 13, 2015

(86) PCT No.: PCT/CN2015/086829
§ 371 (c)(1),
(2) Date: Sep. 18, 2017

(87) PCT Pub. No.: WO2016/145775
PCT Pub. Date: Sep. 22, 2016

(65) Prior Publication Data
US 2018/0073917 A1    Mar. 15, 2018

(30) Foreign Application Priority Data

Mar. 17, 2015    (CN) .......................... 2015 1 0116997
Mar. 26, 2015    (CN) .......................... 2015 1 0137186

(51) Int. Cl.
G01P 5/00    (2006.01)
G01H 11/06    (2006.01)
(Continued)

(52) U.S. Cl.
CPC ................ G01H 11/06 (2013.01); G01P 5/08 (2013.01); G01P 5/24 (2013.01); H04R 7/12 (2013.01);
(Continued)

(58) Field of Classification Search
CPC .. G01H 11/06; G01P 5/08; G01P 5/24; H04R 7/12; H04R 7/14; H04R 2307/023; H04R 2307/025
(Continued)

(56) References Cited

U.S. PATENT DOCUMENTS 9,329,729 B2 *    5/2016  Kim ........................ G06F 3/044
2013/0038379 A1 *  2/2013  Chen .................. H03K 17/9622
                                              327/517
(Continued)

FOREIGN PATENT DOCUMENTS

CN    203710011 U    7/2014
CN    104341776 A    2/2015

OTHER PUBLICATIONS

International search report of PCT Patent Application No. PCT/CN2015/086829 dated Dec. 18, 2015.

*Primary Examiner* — Max H Noori (57) ABSTRACT

A flexible conductive diaphragm comprises at least one conductive film, and the conductive film comprises a flexible support layer (1), a flexible sensitive layer (2) overlapped on the flexible support layer (1), a flexible conductive layer (3) overlapped on the flexible sensitive layer (2), and an electrode (4) electrically connected with the flexible conductive layer (3). A method for preparing the flexible conductive diaphragm and a flexible vibration sensor based on the flexible conductive diaphragm are provided. With the combination of the techniques such as the flexible material, the nano-material and the arrayed micro-structure, the flexible vibration sensor has the characteristics of high sensi-
(Continued)

tivity, low preparation cost, light weight, small thickness, small size, and being foldable and flexible, and can be applied in wearable or adherable electronic devices.

14 Claims, 6 Drawing Sheets

(51) Int. Cl.
    *G01P 5/08* (2006.01)
    *H04R 7/12* (2006.01)
    *G01P 5/24* (2006.01)
    *H04R 7/14* (2006.01)

(52) U.S. Cl.
    CPC .......... *H04R 7/14* (2013.01); *H04R 2307/023* (2013.01); *H04R 2307/025* (2013.01)

(58) Field of Classification Search
    USPC ...................................... 73/862.391, 962.391
    See application file for complete search history.

(56) References Cited

U.S. PATENT DOCUMENTS

| 2016/0011063 | A1* | 1/2016 | Zhang | G01L 1/18 |
| | | | | 600/301 |
| 2016/0226019 | A1* | 8/2016 | Yamazaki | H01L 51/5253 |
| 2017/0075493 | A1* | 3/2017 | Lee | G06F 3/0418 |
| 2017/0265760 | A1* | 9/2017 | Tanriover | A61B 5/02444 |

* cited by examiner

FLEXIBLE CONDUCTIVE DIAPHRAGM, FLEXIBLE VIBRATION SENSOR AND PREPARATION METHOD AND APPLICATION THEREOF

FIELD OF THE INVENTION

The present invention relates to a vibration sensor, more particularly to a flexible vibration sensor based on flexible material, nano-material and micro-structure, and a preparation method and an application thereof. The present invention belongs to the technical field of sensors and smart materials.

BACKGROUND OF THE INVENTION

With the rapid development of wearable devices and the progress of manufacturing technology, the smart device becomes an important research field. It involves multi-disciplines comprehensive technologies including materials science, microelectronics technology, micro electro-mechanical technology, nanotechnology, electronic circuits and systems, sensors technology, and so on. The applications thereof have gradually become the priority research area for lots of multinational corporations. Accordingly, flexible pressure sensors, displayers, accumulators and the like have been introduced already. However, the vibration sensor, which is a sensor for important physical parameters, has rarely been reported as a flexible device.

On the other hand, the vibration sensor, which is one of the key components of measuring and testing technique, is mainly used for receiving mechanical parameters and converting the mechanical parameters to proportional electrical parameters. Since it is an electromechanical conversion device, it is also known as transducer, vibration pickup, and the like. Instead of directly converting an original mechanical parameter to be measured to an electrical parameter, the vibration sensor takes an original mechanical parameter to be measured as an input for the vibration sensor, receives it by means of a mechanical receiving part, generates another mechanical parameter suitable for conversion, and finally converts it into an electrical parameter by means of a mechano-electric conversion part. However, traditional vibration sensors can hardly be applied in wearable devices due to some defects such as inflexibility, large size and high power consumption.

SUMMARY OF THE INVENTION

One of the goals of the present invention is to provide a flexible conductive diaphragm which may be applied in wearable devices and the like as a transducer, to convert mechanical energy into electric signal and detect it, and which has advantages such as good flexibility and stability, low working voltage and power consumption, high sensitivity, and short response time.

One of the goals of the present invention is to provide a method for preparing the flexible conductive diaphragm, which has characteristics such as simple process and easy implementation.

One of the goals of the present invention is to provide a flexible vibration sensor based on the flexible conductive diaphragm, which may be easily integrated in wearable devices.

One of the goals of the present invention is to provide a wearable device based on the flexible vibration sensor.

In order to achieve the above goals, the present invention provides technical solutions as follows.

A flexible conductive diaphragm comprises at least one conductive film, wherein the conductive film comprises a flexible support layer, a flexible sensitive layer overlapped on the flexible support layer, a flexible conductive layer overlapped on the flexible sensitive layer, and an electrode electrically connected with the flexible conductive layer.

In one of the preferred embodiments, the flexible conductive diaphragm may comprise more than two conductive films which are overlapped, wherein the flexible conductive layers of adjacent conductive films may be contacted with each other to form a contact resistance layer which has an adjustable resistance.

Further, the flexible conductive diaphragm may comprise a plurality of conductive films which are overlapped, and more than two contact resistance layers may be formed between the plurality of conductive films.

In one of the preferred embodiments, the flexible sensitive layer may be directly arranged on a surface of the flexible support layer and may be fixedly connected with the flexible support layer.

Further, the flexible sensitive layer may be adhered and fixed to the flexible support layer; and/or the flexible sensitive layer and the flexible support layer may be combined through a cross-linking reaction of polymers.

Further, the combining strength between the flexible sensitive layer and the flexible support layer is enough to ensure that the flexible sensitive layer can be removed directly from the template for the flexible sensitive layer without any damage.

Further, the flexible sensitive layer may have a thickness in a range of 0.1~200 μm, preferably 0.1-10 μm, and more preferably 1 μm.

Preferably, more than one flexible layer may be further arranged between the flexible support layer and the flexible sensitive layer and/or between the flexible sensitive layer and the flexible conductive layer.

In one of the preferred embodiments, the flexible sensitive layer and the flexible conductive layer may be sequentially arranged on both sides of the flexible support layer in an overlapped manner.

Preferably, the material of the flexible support layer may be polyethylene and the thickness thereof may be 1-10 μm.

Further, the surface of the flexible sensitive layer may have an arrayed micro-structure, the micro-structure includes a non-planar micro-structure, and the non-planar micro-structure includes but not limited to pyramid micro-structure, rectangular pyramid micro-structure, triangular pyramid micro-structure, hemisphere micro-structure, and cylinder micro-structure.

Preferably, the micro-structure may be formed as pyramid-shaped rectangular pyramids, wherein the bottom surface of each pyramid is a square with a side of length 1-200 μm, the angle between the side surface and the bottom surface is 0-90°, preferably 54.7°, and the distance between adjacent pyramids is 1-200 μm.

In one of the preferred embodiments, the flexible conductive layer may be conformally adhered on the surface of the flexible sensitive layer.

Further, the flexible conductive diaphragm may comprise more than two conductive films which are overlapped, wherein a top point of a non-planar micro-structure of one flexible conductive layer thereof is electrically contacted with another matching flexible conductive layer.

Furthermore, wherein a top point of a non-planar microstructure of one flexible conductive layer may be electrically contacted with a planar area of another matching flexible conductive layer.

Further, the material of the flexible sensitive layer may include high polymer material, for example but not limited to polyethylene terephthalate, polydimethylsiloxane, polyimide, polyurethane, polyvinyl alcohol, polyvinyl formal, and polyethylene, and polydimethylsiloxane is preferred.

Further, the material of the flexible support layer may include high polymer material, for example but not limited to polyethylene terephthalate, polydimethylsiloxane, polyimide, polyurethane, polyvinyl alcohol, polyvinyl formal, and polyethylene.

Further, the material of the flexible conductive layer may include conductive material or a combination of conductive material and unconductive material. For example, the conductive material at least may be selected from carbon nanotube, grapheme, metal nanowire, and conductive polymer materials. The unconductive material includes polymer, for example but not limited to polydimethylsiloxane, polyethylene terephthalate, polyimide, polyurethane, polyvinyl alcohol, polyvinyl formal, and polyethylene.

Preferably, the flexible conductive layer may be made of carbon nanotube film prepared by spraying, and the square resistance of the device obtained accordingly is 0.1-100 k$\Omega$/$\square$.

Further, the material of the electrode may include metal or non-metal conductive material. For example, the metal may be, but is not limited to be, gold, platinum, nickel, silver (e.g. silver nanowire), indium, copper, and aluminum, and the non-metal may be, but is not limited to be, carbon nanotube, and graphene.

Preferably, the electrode may have a thickness of 1~10 μm. Preferably, the electrode may be made of copper foil.

In one of the feasible implementations, the electrode may be connected with the flexible conductive layer by conductive adhesive.

A method for preparing a flexible conductive diaphragm comprises:
(1) preparing a template for a flexible sensitive layer and forming a flexible sensitive layer on a surface of the template;
(2) forming a flexible support layer on the flexible sensitive layer;
(3) removing the flexible sensitive layer and the flexible support layer from the template;
(4) forming a flexible conductive layer on the flexible sensitive layer, and electrically connecting an electrode to the flexible conductive layer.

Further, a surface of the template may have a micropattern structure which corresponds with the arrayed microstructure formed on the flexible sensitive layer.

In one of the preferred implementations, the step (1) may comprise: forming at least a release agent layer on a surface of the template, then forming the flexible sensitive layer on the release agent layer, wherein the release agent comprises trimethylchlorosilane or perfluorooctyl trichlorosilane.

In one of the preferred implementations, the step (2) may comprise: performing surface treatment for the flexible support layer or the flexible sensitive layer, then combining the flexible support layer and the flexible sensitive layer, wherein the surface treatment is performed in a manner including strong acid oxidation, plasma treatment, or ultraviolet and ozone treatment. Further, the surface treatment may be performed for 1-30 minutes.

In one of the preferred implementations, the step (2) may further comprise: adhering the flexible support layer and the flexible sensitive layer to achieve the combination of them, or combining the solidified or partially solidified flexible support layer and the solidified or partially solidified flexible sensitive layer through a cross-linking reaction. For example, in a vacuum environment, reacting for 30 minutes to 6 hours at a reaction temperature of 50-200° C. to achieve a complete cross-linking reaction.

Further, the flexible conductive layer may be formed by evaporation, chemical deposition, printing, spraying, sputtering, etc.

Further, the electrode may be prepared by evaporation, chemical deposition, printing, spraying, sputtering, etc.

A flexible vibration sensor comprises the above-mentioned flexible conductive diaphragm.

The flexible vibration sensor may be used for detecting flow velocity, capturing sound, etc.

A wearable or adherable device comprises the above-mentioned flexible conductive diaphragm or the above-mentioned flexible vibration sensor.

Compared with the prior art, the present invention has advantages as follows.

(1) It provides a new flexible conductive diaphragm, in which a flexible support layer and a flexible sensitive layer are fixedly connected, and in particular are combined through a cross-linking reaction. Therefore, with the flexible support layer, the flexible sensitive layer can be directly and quickly removed from the template without damage during the preparation. In this way, the flexible sensitive layer can be made very thin (having a thickness of as little as 0.1 μm), and thus may have high sensitivity similar to microphones, thereby achieving sound detection without contact.

(2) It provides a flexible vibration sensor, in which the main components can be made from cheap raw materials such as carbon nanotube and high molecular polymer. The preparation process is simple, without the need of high temperature procedure. It involves both nano-material and unique micro-structure, and improves the sensitivity and stability of the device.

(3) With the combination of the flexible vibration sensing technique and new micro/nano-sensing technique, the flexible vibration sensor of the present invention has the characteristics of being ultrathin, ultra-light and flexible, and can be integrated in wearable devices easily. Furthermore, it has low working voltage and power consumption, high sensitivity and short response time, and provides an excellent user experience.

BRIEF DESCRIPTION OF THE DRAWINGS

In order to illustrate embodiments of the invention or existing technical solutions more clearly, drawings of the embodiments and the existing technical solutions are briefly described below. It is apparent that the described drawings below merely illustrate some embodiments of the invention. Other drawings can be derived from these drawings by those skilled in the art without involving any inventive step.

FIG. 3 is an SEM image illustrating an arrayed microstructure on a surface of a flexible sensitive layer in an embodiment of the invention;

DETAILED DESCRIPTION OF ILLUSTRATED EMBODIMENTS

Aiming at the existing problems, the inventors provide the technical solutions of the invention after long-term research and numerous practices. The technical solutions according to the embodiments of the present invention will be explained below in detail in conjunction with figures of the embodiments. It is apparent that the described embodiments are merely some embodiments of the present invention, but are not to limit the invention in any form. On the basis of these embodiments of the present invention, those skilled in the art may get other equivalent embodiments without involving any inventive step. The present invention is intended to cover all equivalent arrangements included within the scope of the present invention.

Figure 1:
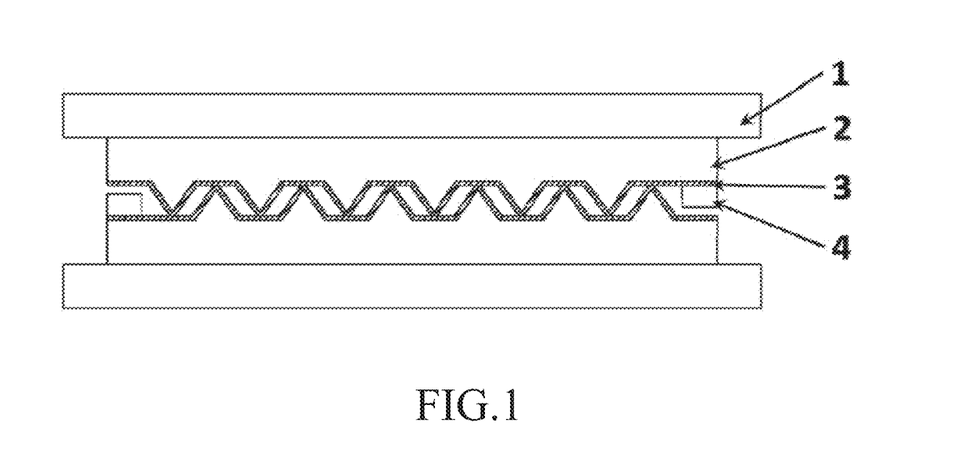
FIG. 1 is a schematic drawing of a double-layer flexible conductive diaphragm according to an embodiment of the present invention.

Referring to FIG. 1, a double-layer flexible conductive diaphragm is provided in an embodiment of the present invention. Herein, each layer of conductive film comprises a flexible support layer 1, a flexible sensitive layer 2 formed on an upper surface of the flexible support layer 1, a flexible conductive layer 3 formed on the flexible sensitive layer 2, and an electrode 4 electrically connected to the flexible conductive layer 3.

Herein, the materials of individual layer are described above and are not repeatedly described.

Furthermore, the conductive film may be prepared by a method as follows, comprising:

S1. Forming an Organic Molecular Layer on a Surface of a Template

Processing (such as by vapor deposition or fume coating) a thin organic molecular layer (trimethylchlorosilane or perfluorooctyl trichlorosilane) on the surface of the template such as a silicon wafer, so as to make sure that the flexible sensitive layer formed on the surface of the template can be separated from the template readily and integrally.

S2. Forming a Flexible Sensitive Layer on the Organic Molecular Layer

Then, spin coating unpolymerized polymer precursor or a mixture of various polymer precursors (e.g. one or a mixture of more of polyethylene terephthalate, polyimide, polydimethylsiloxane, polyurethane, polyvinyl alcohol, polyvinyl formal, and polyethylene) on the organic molecular layer to form a uniform film of flexible sensitive layer.

S4. Providing Surface Treatment for the Flexible Support Layer

Providing surface treatment for the film of the flexible support layer by anyone or any combination of strong acid oxidation, plasma treatment, and ultraviolet and ozone pretreatment.

S5. Forming a Flexible Support Layer on the Flexible Sensitive Layer

After that, overlapping a surface-treated flexible support layer on a surface of the above mentioned film of flexible sensitive layer.

S6. Heat-Treating, and Removing the Solidified Flexible Sensitive Layer and Flexible Support Layer From the Template Heating the flexible sensitive layer and the flexible support layer in a vacuum environment for a period of time, until the flexible support layer and the flexible sensitive layer are fully integrated with each other. Then, removing a film of the flexible support layer and the flexible sensitive layer which are fully integrated with each other from the surface of the template, whereby molding the flexible sensitive layer with the micro-pattern of the template to form a micro-structure.

S7. Forming a Flexible Conductive Layer on the Flexible Sensitive Layer

Figure 3:
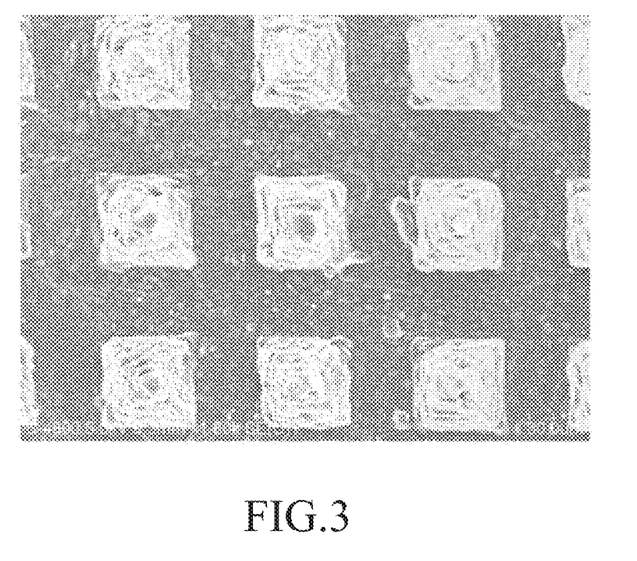

Then, preparing a layer of conductive material on the flexible sensitive layer by means of a spray gun. For example, FIG. 3 shows a surface appearance of an exemplary device formed in this way when viewed through an electron microscope.

In one of the preferred embodiments, the flexible conductive layer is conformally adhered on a surface of the flexible sensitive layer.

S8. Forming an Electrode on the Flexible Conductive Layer

Adhering a layer of conductive material on the flexible conductive layer by silver paste, so that a single layer of flexible conductive film may be formed after some procedures such as solidification.

S9. Forming a Double-Layer Conductive Diaphragm

Finally, overlapping a plurality of conductive diaphragms in such a manner that the micro-structured surfaces of the flexible conductive layers are partially contacted with each other, to form a double-layer conductive diaphragm.

In one of the preferred embodiments, a top point of a non-planar micro-structure of one flexible conductive layer is electrically contacted with another matching flexible conductive layer. With this configuration, fewer contact points are provided and the sensitivity is further increased.

Manufacturing a flexible vibration sensor with the above-mentioned flexible conductive diaphragm and the flexible vibration sensor may be used for detecting flow velocity and capturing sound.

In the above-mentioned procedures, the inventors of the present invention respectively prepared the flexible sensitive layer and the flexible support layer having different thickness with various high polymer materials listed above. It is found that, in the case that the flexible support layer has a thickness more than 1 μm, the flexible sensitive layer which has a thickness more than 0.1 μm can be removed completely from the template without any damage.

In a sharp contrast, in the case that no flexible support layer is provided, that is, steps S4 and S5 are omitted, when removing the flexible sensitive layer which has a thickness less than 200 μm from the template, the damage of the flexible sensitive layer can hardly be avoided.

Figure 6:
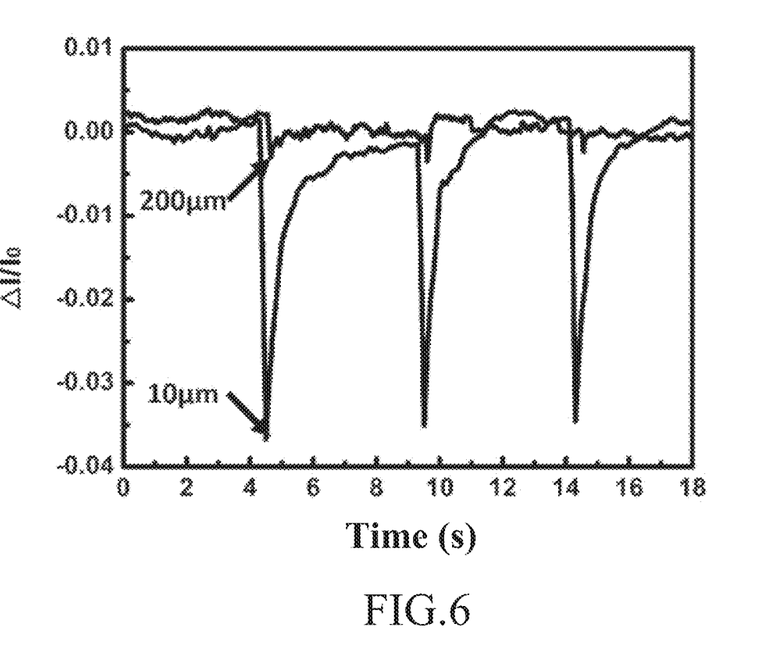
FIG. 6 depicts a comparison graph that shows a flexible vibration sensor according to an embodiment of the present invention responds to sound, in which the flexible vibration sensor is provided with a flexible sensitive layer with a thickness of 200 μm or 10 μm.

Whereas, no matter which high polymer material of the flexible sensitive layer is, the devices which are manufactured with the flexible sensitive layer having a thickness more than 200 μm have very low signal-to-noise ratios and cannot be used for detecting sound at all. For example, referring to FIG. 6 which depicts a test graph showing a flexible vibration sensor, which employs a flexible sensitive layer mainly consisting of the polydimethylsiloxane and so on and having a thickness of 200 μm, responds to sound. In the case a sound is given for the flexible vibration sensor in the 15th second, 20th second, 25th second, 30th second, respectively, the device shows very little response to the sound. Again, referring to FIG. 6, in the case that the flexible sensitive layer has a thickness of 10 μm, the device shows very high sensitivity.

The flexible vibration sensor, which is configured with the flexible conductive diaphragm of the present invention, has excellent performances in terms of sensitivity, signal-to-noise ratio, etc. In particular, the less the thickness of the flexible sensitive layer is, the much more excellent performances thereof such as the sensitivity and the signal-to-noise ratio are.

Figure 4:
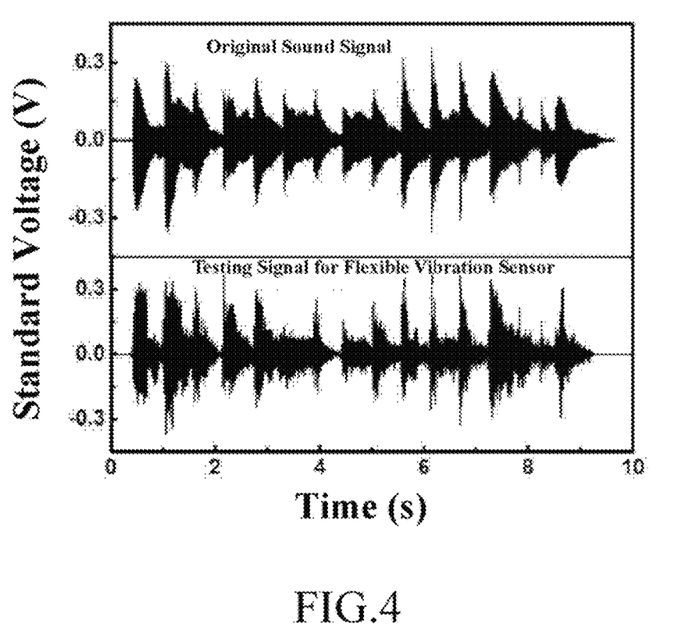
FIG. 4 depicts a graph that shows the changes in voltage of a flexible vibration sensor according to an embodiment of the present invention in response to sound vibration, over time.

For example, referring to FIG. 4, in the case that an exemplary flexible vibration sensor of the present invention is positioned close to a speaker, when the speaker makes a sound, the flexible vibration sensor automatically collects sound signals, converts the sound signals to voltage signal output. Herein, the similarity degree between the generated voltage signals and original sound signals is very high.

Figure 5:
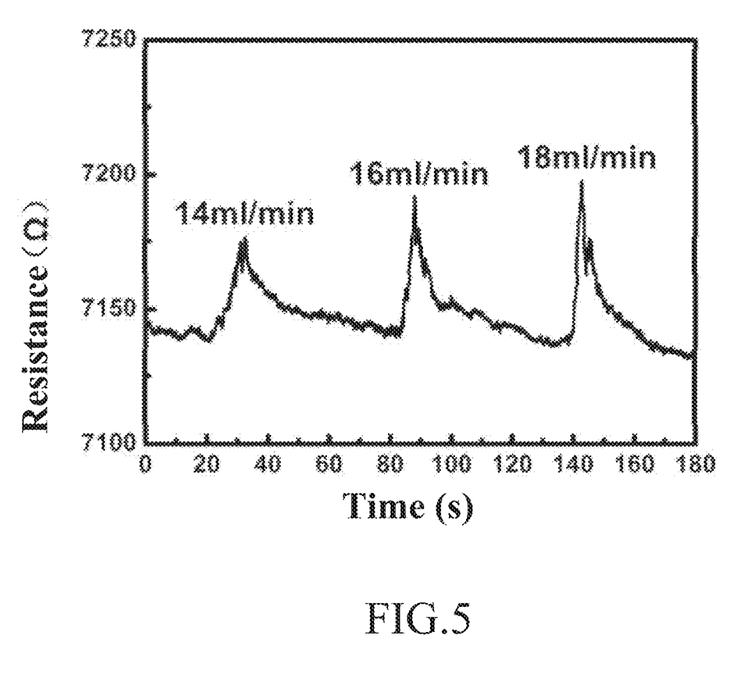
FIG. 5 depicts a graph that shows the changes in resistance of a flexible vibration sensor according to an embodiment of the present invention in response to water velocity, over time.

Furthermore, the flexible vibration sensor may be placed in a water tank in which a constant flow is provided by an injection and a stepping motor. When the water flow has different flow velocities, the device has different vibration intensity. Hence, the device shows different response to the water flow with different flow velocities. When such response is converted to resistance signal output, a curve shown in FIG. 5 is obtained. Herein, when the flow velocity changes, the detected-signal intensity of the flexible vibration sensor changes. As the flow velocity is increased, the signal intensity is increased. Thereby, the flexible vibration sensor may be used for detecting fluid flow velocity.

Figure 2:
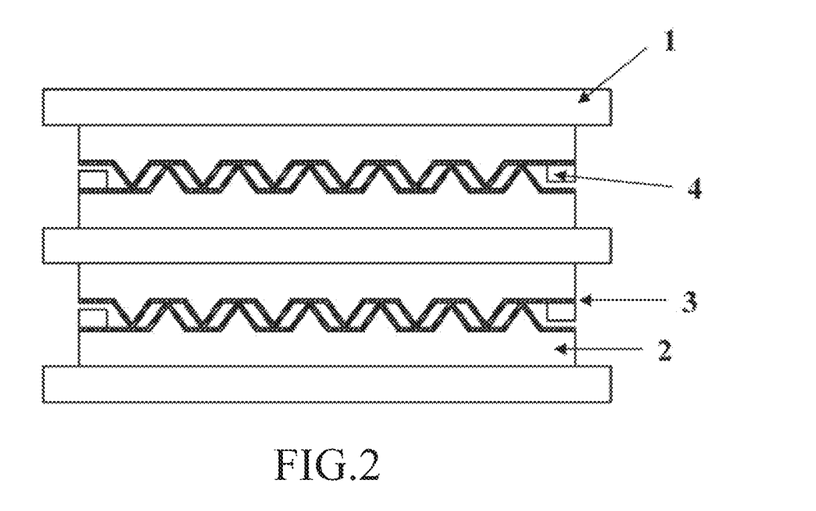
FIG. 2 is a schematic drawing of a multi-layer flexible conductive diaphragm according to an embodiment of the present invention.

It is also conceived that a plurality of conductive films may be overlapped to form a multi-layer flexible conductive diaphragm as shown in FIG. 2. When the device manufactured with such multi-layer flexible conductive diaphragm is tested in a similar manner as mentioned above, it shows excellent sensitivity and signal-to-noise ratio.

In the present invention, the multi-layer flexible conductive diaphragm is used for sensing vibration as a core component for the flexible vibration sensor. Compared with traditional vibration sensors, the device has much higher sensitivity, lower thickness and mass, and good flexibility. Therefore, the flexible vibration sensor may be integrated into wearable devices and may be used for detecting flow velocity, capturing sound, etc.

It should be explained that, in this document, the terms such as "comprise", "include" or any other variants are intended to cover non-exclusive inclusions, such that a process, method, article or apparatus that comprises a list of elements is not necessarily limited to those elements, but may include other elements not expressly listed or inherent to such process, method, article or apparatus. The element, limited by a description "comprise a" but without further limitations, shall not exclude other identical elements existed in the process, method, article or apparatus which comprises the elements.

The embodiments described above are merely some specific embodiments of the present invention. It is apparent that the described embodiments are merely some embodiments of the present invention, but are not to limit the invention in any form. It should be noted that, those skilled in the art may change or modify it without departing from the principle of the present invention. The present invention is intended to cover all changes and modifications included within the scope of the present invention.

The invention claimed is:

1. A flexible conductive diaphragm, characterized in that: it comprises two or more conductive films which are overlapped, wherein each conductive film comprises a flexible support layer, a flexible sensitive layer overlapped on the flexible support layer, a flexible conductive layer overlapped on the flexible sensitive layer, and an electrode electrically connected with the flexible conductive layer, an arrayed micro-structure is provided on a surface of the flexible sensitive layer, and the micro-structure includes a non-planar micro-structure, wherein the flexible conductive layers of adjacent conductive films are contacted with each other to form a contact resistance layer with a resistance being adjustable.

2. The flexible conductive diaphragm according to claim 1, characterized in that: it comprises a plurality of conductive films which are overlapped, and more than two contact resistance layers are formed between the plurality of conductive films.

3. The flexible conductive diaphragm according to claim 1, characterized in that: the flexible sensitive layer is adhered and fixed to the flexible support layer; or, the flexible sensitive layer and the flexible support layer are combined with each other.

4. The flexible conductive diaphragm according to claim 1, characterized in that: the flexible sensitive layer has a thickness of 0.1~200 μm.

5. The flexible conductive diaphragm according to claim 1, characterized in that: more than one flexible layer is further arranged between the flexible support layer and the flexible sensitive layer and/or between the flexible sensitive layer and the flexible conductive layer.

6. The flexible conductive diaphragm according to claim 1, characterized in that: the non-planar micro-structure includes pyramid, rectangular pyramid, triangular pyramid, hemisphere, or cylinder micro-structure.

7. The flexible conductive diaphragm according to claim 6, characterized in that: the flexible conductive layer is conformally adhered on a surface of the flexible sensitive layer.

8. The flexible conductive diaphragm according to claim 7, characterized in that: wherein a top point of a non-planar micro-structure of one flexible conductive layer is electrically contacted with another matching flexible conductive layer.

9. The flexible conductive diaphragm according to claim 8, characterized in that: wherein a top point of a non-planar micro-structure of one flexible conductive layer is electrically contacted with a planar area of another matching flexible conductive layer.

10. The flexible conductive diaphragm according to claim 1, characterized in that: the material of the flexible sensitive layer or the flexible support layer includes high polymer material which is at least selected from polyethylene terephthalate, polydimethylsiloxane, polyimide, polyurethane, polyvinyl alcohol, polyvinyl formal, and polyethylene.

11. A method for preparing the flexible conductive diaphragm according to claim 1, characterized in that it comprises steps of:

at first, preparing two or more conductive films, wherein steps of preparing each of the conductive films comprise:

(1) preparing a template for a flexible sensitive layer and forming a flexible sensitive layer on a surface of the template;
(2) forming a flexible support layer on the flexible sensitive layer;
(3) removing the flexible sensitive layer and the flexible support layer from the template;
(4) forming a flexible conductive layer on the flexible sensitive layer, and electrically connecting an electrode to the flexible conductive layer,
wherein, in the step (1), preparing the template with the surface having a micro-pattern structure, and forming, on a surface of the flexible sensitive layer, an arrayed micro-structure which corresponds with the micro-pattern structure and includes a non-planar micro-structure,
then, overlapping the conductive films in such a manner that the flexible conductive layers of adjacent conductive films are contacted with each other to form a contact resistance layer with a resistance being adjustable.

12. The method for preparing the flexible conductive diaphragm according to claim 11, characterized in that the step (2) comprises:
performing surface treatment for the flexible support layer or the flexible sensitive layer, then combining the flexible support layer and the flexible sensitive layer, wherein the surface treatment is performed in a manner including strong acid oxidation, plasma treatment, or ultraviolet and ozone treatment.

13. A flexible vibration sensor, characterized in that: it comprises the flexible conductive diaphragm according to claim 1.

14. The method for preparing the flexible conductive diaphragm according to claim 11, characterized in that the step (2) comprises:
adhering the flexible support layer with the flexible sensitive layer to achieve a combination thereof, or combining solidified or partially solidified flexible support layer with solidified or partially solidified flexible sensitive layer through a cross-linking reaction.

* * * * *